United States Patent [19]

Duffy et al.

[11] Patent Number: 4,888,214
[45] Date of Patent: Dec. 19, 1989

[54] APARATUS AND METHOD FOR COATING FASTENERS

[75] Inventors: Richard J. Duffy, Utica; Anthony DiMaio, Mephis; Eugene D. Sessa, Mt. Clemens, all of Mich.

[73] Assignee: Nylok Fastener Corporation, Rochester, Mich.

[21] Appl. No.: 149,535

[22] Filed: Jan. 28, 1988

[51] Int. Cl.$^4$ .......................... B05D 1/12; B05D 7/22
[52] U.S. Cl. .................................... 427/183; 427/181; 427/195; 10/10 P; 118/308; 118/319
[58] Field of Search ................ 118/308, 319; 427/181, 427/182, 183, 195; 10/10 P

[56] References Cited

U.S. PATENT DOCUMENTS

| 3,592,676 | 7/1941 | From et al. | 118/308 X |
| 3,797,455 | 3/1974 | Scheffer et al. | 118/308 |
| 3,894,509 | 7/1975 | Duffy et al. | 118/319 X |
| 4,100,882 | 7/1978 | Duffy et al. | 118/308 X |
| 4,366,190 | 12/1982 | Rodden et al. | 118/308 X |
| 4,384,907 | 5/1983 | Aidlin et al. | 118/319 X |

Primary Examiner—Shrive Beck
Attorney, Agent, or Firm—Niro, Scavone, Haller & Niro, Ltd.

[57] ABSTRACT

Apparatus and method employed in applying a useful coating to fasteners is disclosed. Particularly, a resin material in powder form is preferably applied to a selected surface of the fastener to cover a desired length of the threads of the fastener. The apparatus includes a support for moving the fasteners deposited thereon to a position where the coating is applied, and a positioning device is provided to insure that the fastener is peripherally located for application of the coating. A cam mechanism associated with a plurality of tubes provides movement of the tubes for application of the resin material to the fasteners. The fasteners are subsequently removed from the support by fluid pressure.

23 Claims, 5 Drawing Sheets

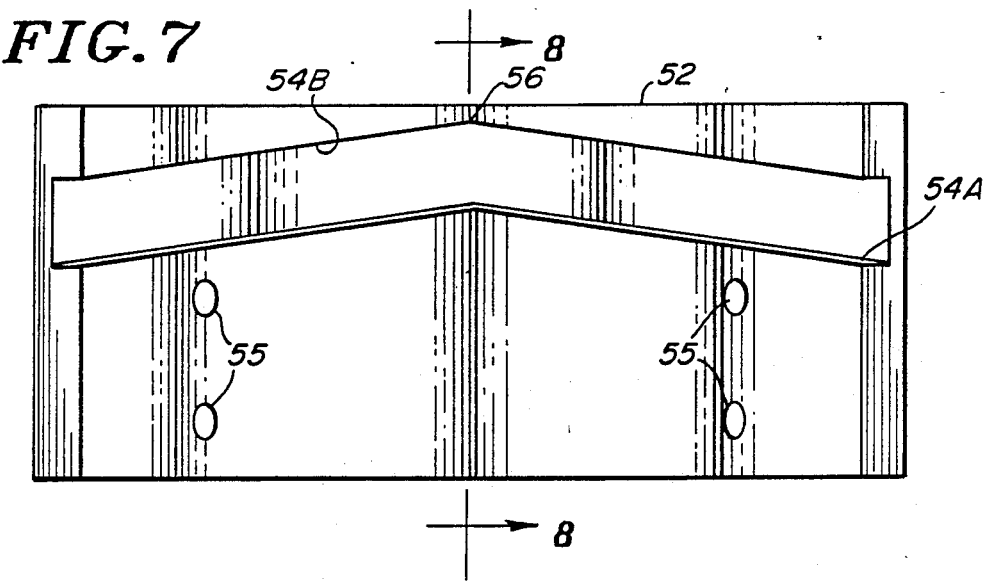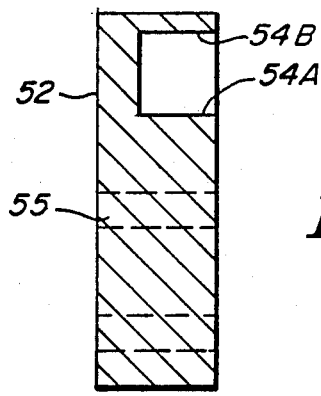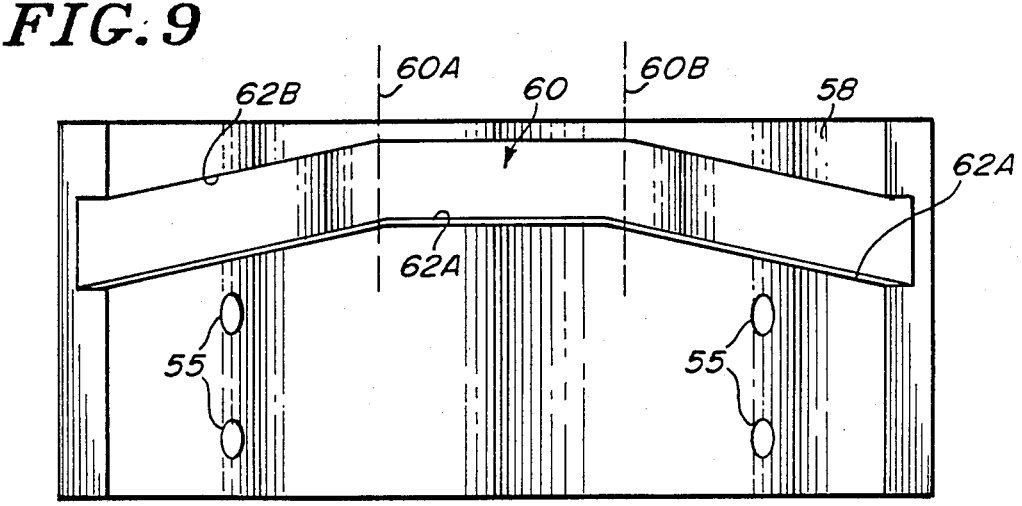

APARATUS AND METHOD FOR COATING FASTENERS

BACKGROUND OF THE INVENTION

The present invention relates to the coating of fasteners, and more particularly to an apparatus and process for applying a coating to elements or fasteners, particularly to the threads of an internally threaded element.

In the field of fastener manufacture, a number of machines and processes have been particularly developed for the application of a coating, or patch, to the threads of a fastener element to provide locking engagement with a mated threaded article. Also, various methods and apparatus for applying locking patches of resilient resin to threaded articles have been previously disclosed. These devices generally include a rotatable table, or transport belt arrangement which is disposed for receiving fastening elements. Such devices also typically convey the fastening elements through a plurality of stations to effect application of the coating to the threads of the threaded article or the fastener element.

For example U.S. Pat. No. 4,054,688 and U.S. Pat. No. 4,100,882 disclose devices for forming patches on fasteners whereby resin particles are deposited on one area of the heated threads of an element, and thereafter, the resin particles are deposited on an additional area of the threads to produce two distinct patches at desired locations. In each of the aforementioned patents, internally threaded articles are retained on a rotatable support member in a selected position by means of a slot which receives a portion of the external surface of a hex head nut. After a discrete patch is applied to the internal threads of the fastener, a turning moment is applied to the fastener to move it such that a different external portion of the thread of the hexagonal element is received by the slot, after which a second discrete patch is applied to the threads of the fastener.

Other disclosed devices are found in U.S. Pat. No. 3,858,262 and U.S. Pat. No. 3,894,509. In U.S. Pat. No. 3,858,262, the disclosed method and apparatus is intended to avoid the difficulties of resin deposit on the end surfaces of the threaded element and is effective to deposit resin on selected threads with a minimum of spatter. In that method and apparatus, a nut or other internally threaded member is heated and the internal threads of the heated nut are sprayed with resin particles which are caught and built up on the heated surfaces to form a locking plastic body. The method and apparatus disclosed in U.S. Pat. No. 3,894,509 includes automatic means to move a succession of the internally threaded elements through various stations in which the elements are subjected to treatment at the various stations. A resilient resin locking patch is formed on the threaded surface of the elements by deposition of heat fusible resin powder and thereafter, the elements are unloaded.

U.S. Pat. No. 3,416,492 and U.S. Pat. No. 4,366,190 are further disclosures directed to methods and apparatus wherein a self-locking internally threaded element is manufactured having a locking body of resilient resin provided to the threads. In these patents, however, the resin is provided over 360° of arc of a portion of the internal threads.

As will be observed from a review of the above patents, development of machines and processes for manufacturing threaded articles having a coating or patch applied to the threads has been prevalent. Furthermore, many of the devices disclosed in the prior art have proved to be successful in meeting the specific requirements of the marketplace at the time they were developed. However, with the employment of machines of the type described for not only applying locking patches to a threaded article, but for the application of Teflon (a registered trademark of Dupont Corporation) and a variety of other resin type materials to fasteners, threaded articles and the like for protection, masking, insulating and lubricating of fasteners and the threads of such articles, a specific need has arisen for a machine and process having improved control over the size, shape and extent of the applied coating or patch. Moreover, a machine which is improved in function and operation, improved in efficiency and of simpler construction than those presently found in the marketplace is also desired.

It is therefore an object of the present invention to provide an apparatus and process for the manufacture of internally threaded articles which has improved control of the application of coating material to the fastener or similar article and particularly to the threaded portion of such elements.

A further object of the invention is to provide apparatus having increased reliability and flexibility, as well as reduced set up time over apparatus of the prior art. Furthermore, it is desired to provide a process and apparatus which has improved operational efficiency and flexibility over prior art devices and processes.

Yet another object of the invention is to provide apparatus and process for the manufacture of internally threaded elements wherein the coating operation, including but not limited to the control and definition of the coating, is achieved by a simply constructed cam device.

SUMMARY OF THE INVENTION

The above objects, as well as other objects which will be become apparent as the description proceeds, are achieved by providing apparatus for applying a resin coating onto a surface of an article having an opening on at least one end which includes a support for receiving the article and conveying it along a path with the article in substantially fixed relation relative to the support. The longitudinal axis of the article is oriented in an up and down position with the opening disposed on the lower end of the article, and substantially uncovered. A conduit member including an elongated tube having its upper end disposed in a first position beneath the support and substantially on the longitudinal axis of the article is provided. The tube includes an opening formed in its upper end facing radially outwardly from the tube over an arcuate portion thereof. The tube is mounted for relative movement from the first position wherein the upper end of the tube lies beneath the support to a second position wherein the upper end of the tube lies within the article opening. Further, the tube may traverse the entire thickness of the article to completely coat the desired surface. Means for moving the tube from the first position to the second position in response to movement of the support along its path.

Movement of the tube may be provided by a member disposed adjacent to, and substantially fixed relative to, the path of the article. Means for moving the tube may include a cam surface disposed for engagement with a cam follower associated with the conduit member. Preferably, the article is an internally threaded article having an opening on both its lower and upper ends so as to provide an aperture through the article. This provides for substantially complete coating of the internal surfaces of the article, where desired.

The support is provided with a plurality of pockets formed for receiving the article, and a rotatable member is disposed adjacent the support at a point on the path of the support for contacting an article which has been deposited outside a respective pocket. If an article is not properly positioned within a pocket, the rotatable member contacts the improperly positioned article and rotates to move or slide the article into the pocket.

The apparatus is further provided with a fluid pressure source directed towards the outer periphery of the support along its path of rotation. The fluid pressure is directed such that each pocket passes adjacent thereto whereby an article is removed from the pocket by fluid force when the fluid pressure source is activated. A second fluid pressure source may also be included. The fluid pressure from the second source is directed at the articles on the support to remove excess powder prior to directing the articles off of the support.

The process for applying a patch of resin onto a succession of internally threaded articles each having an opening on at least one end thereof includes the steps of conveying the articles on a support along a path for application of the resin. The longitudinal axes of the articles are disposed in an up and down position with the openings disposed at the lower end thereof and substantially uncovered. Particles of resin under pressure are directed from the end of a tube disposed substantially on the centerline of the longitudinal axes of the articles to cover an area of the articles with resin material. The tube is moved up and down along the longitudinal axes of the articles in response to movement of the support to extend the arcuate area of material a desired distance.

The process further includes the step of discharging a flow of fluid from the end of the tube while the tube is positioned above the support to effect cleaning of resin particles from the tube. The resin material may be applied over an arcuate area of 360° and over a predetermined portion of the surface to be coated. Adding to the versatility and flexibility of the present invention, the arcuate area to be coated as well as the height of the coating may be selected by the operator prior to the processing operation.

BRIEF DESCRIPTION OF THE DRAWING

For a more complete understanding of the invention, reference should be made to the following description of a the preferred embodiments, taken in conjunction with the accompanying drawings wherein:

FIG. 7 is an elevational view of one embodiment of a cam element of the device of FIGS. 1 through 6 showing details of the cam element for clarity;

FIG. 8 is a right sectional view taken along the lines VIII—VIII of FIG. 7; and

FIG. 9 is a sectional view similar to FIG. 8 illustrating a second embodiment of a cam element for use with the present invention.

DESCRIPTION OF THE PREFERRED EMBODIMENT

Figure 1:
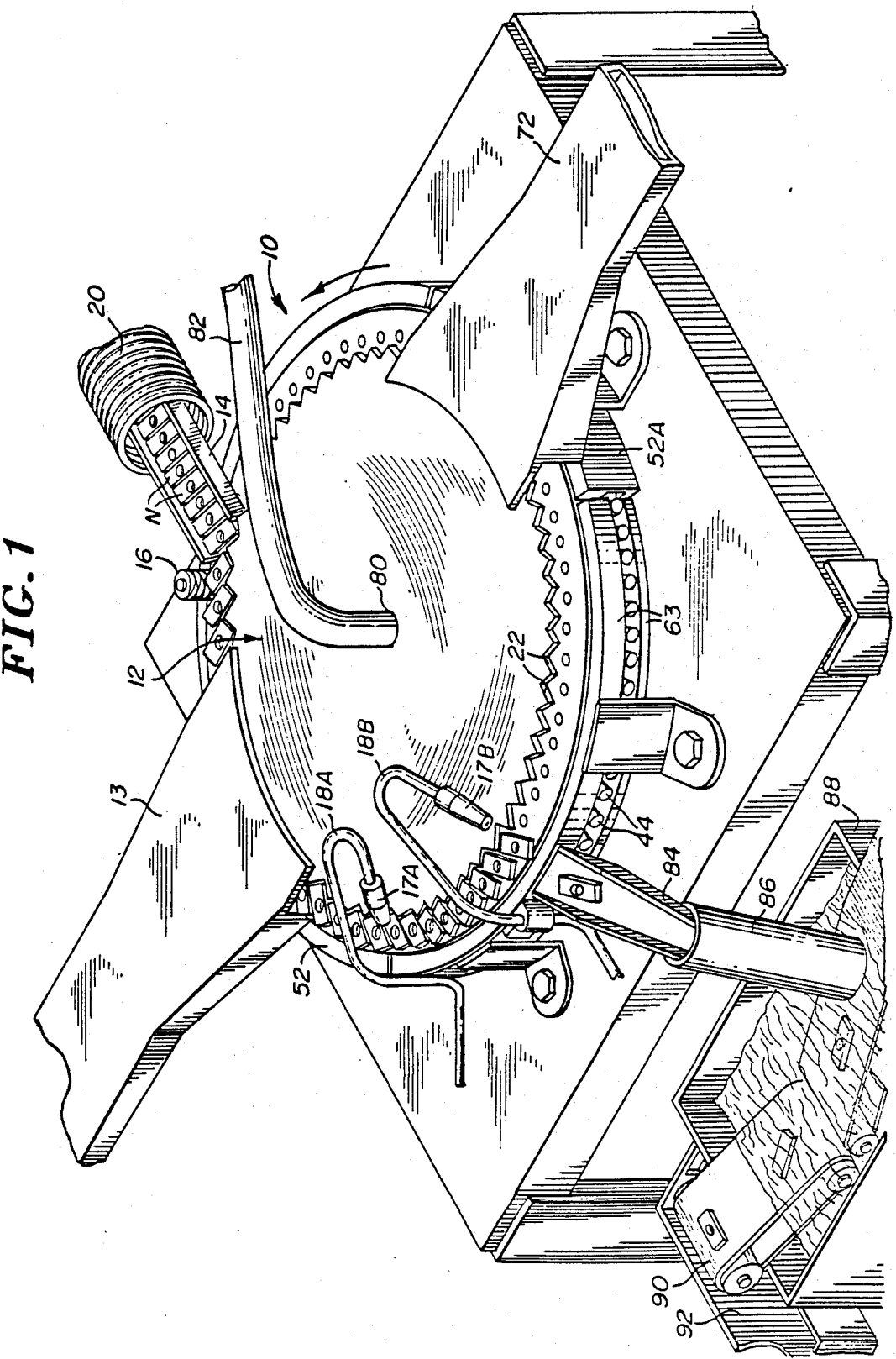
FIG. 1 is a perspective view showing a device employed in the coating of fasteners constructed in accordance with the teachings of the present invention.

While this invention is susceptible of embodiment in many different forms, there is shown in the drawings and will herein be described in detail illustrated embodiments of the invention. It should be understood, however, that the present disclosure is to be considered as an exemplification of the principles of the invention and is not intended to limit the invention to the embodiment illustrated.

The present invention will be described in relation to coating internally threaded articles such as pierce nuts N. However, it is to be understood that the present invention is useful in coating a variety of fasteners including an aperture on at least one end as well as on both ends of the fastener. Such fasteners may include, but are not limited to, weld nuts, collar nuts and similar fasteners.

The present method and apparatus may also be used to apply a variety of coatings to fasteners. Such coatings include, but are not limited to, non-conductive coatings, lubricating coatings, a combination of both non-conductive and lubricating coatings as well as similar types of coatings. Furthermore, such coating materials may include, but are not limited to, thermoplastic or thermosetting materials. Specifically, such coatings may include, but are not limited to nylon, acrylic, as well as fluorocarbon and polyethylene based materials. An example of such a material is manufactured by DuPont Corporation and is distributed under the trademark Teflon-P.

Referring to the drawing, and in particular to FIGS. 1 through 4, there is shown apparatus for coating fasteners, generally designated as 10, and in particular, for applying a coating onto a predetermined area of a fastener, particularly the threaded portion of an internally threaded article such as a pierce nut N. The apparatus generally comprises a rotatably mounted transport and support member in the form of a table 12 movable along a predetermined rotary path about its central axis in the direction shown by the arrows of FIGS. 1 and 2.

Figure 3:
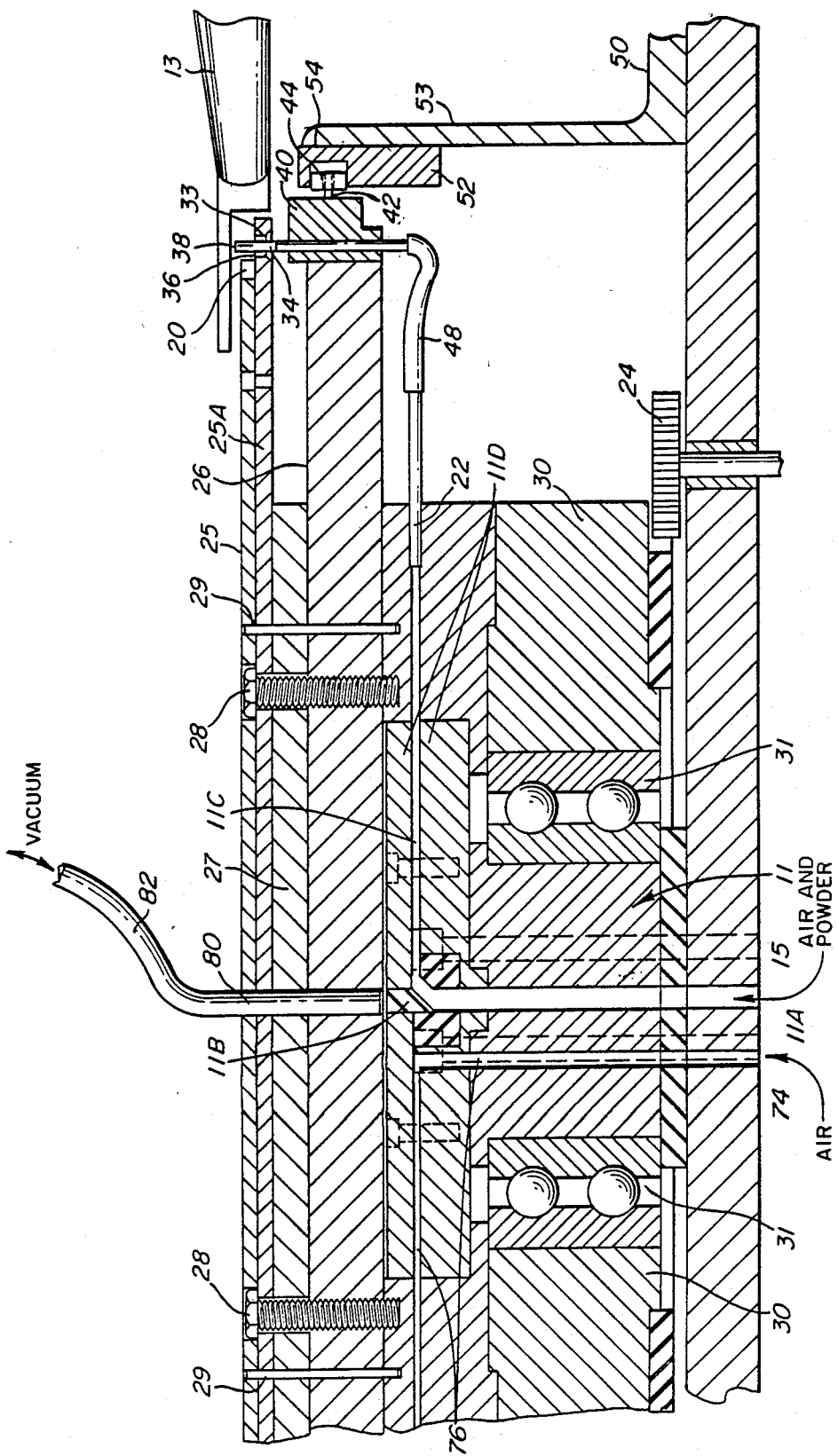
FIG. 3 is a sectional elevational view taken along the line III—III of FIG. 2 showing internal details of the structure of FIGS. 1 and 2.

The table 12 is continuously rotated about a fixed housing 11 as best shown in FIGS. 1 and 3 and the periphery of the table 12 is seen to pass through a plurality of stationary work areas which are stages of the operation carrying out the process of the present invention.

During the first stage of operation, a loading chute 14 is effective to deposit pierce nut N onto table 12 and during the next stage, a patch of resin material in powdered form is applied to the internal threaded portion of the pierce nut. This stage is substantially enclosed by a vacuum hood 13 which removes excess powdered material from the apparatus and the environment into which the powdered material is being deposited. The removal of excess powder in this manner provides for reuse of the powder adding to the efficient operation of the present invention. Between the loading chute 14 and the point within vacuum hood 13 where the resin material is being applied, there is located a rotatable member 16, fixed in relation to rotating table 12. The function of rotatable member 16 will be explained in detail below.

Downstream of loading chute 14 with regard to the path of rotation of table 12, it will be observed that fixed tubes 18A and 18B terminating in nozzles 17A and 17B are directed outwardly and downwardly toward the periphery of table 12. The function of these nozzles 17A and 17B will become evident as the description proceeds.

An induction heating coil 20 is disposed about chute 14 to heat the pierce nut N above the melting temperature of the resin to be applied. It has been, determined that induction heating coil 20 may operate through an induction generator (not shown) operating in the range of 8 kHz to 15 kHz, and more preferably in the range of 10 kHz to 12 kHz. These operational ranges provide improved heating of the fasteners as well as improved operational and cost efficiency of the overall apparatus and process of the present invention. As may be appreciated by those skilled in the art, while an induction heating coil is disclosed herein, a variety of heating elements may be utilized to heat the fasteners as they move down chute 14. Such heating elements may include, but are not limited to, induction heaters, ultrasonic heaters, infrared heaters, furnaces and similar heating devices.

In carrying out the present invention, pierce nuts N are heated to a temperature in a range to provide flow of the material to be applied to the fastener to coat the fastener in a satisfactory manner. For example, in application of Teflon powder, the temperature range is from about 570 degrees Fahrenheit to 1000 degrees Fahrenheit, and more preferably, from about 750 degrees Fahrenheit to about 850 degrees Fahrenheit. Specifically, these temperature ranges provide a heated fastener sufficiently above the melting point of the Teflon powder material and provide an acceptable coating when applied. The heating element, preferably an induction heater including induction heating coil 20, includes variable power setting capabilities which allows adjustment of the output of the generator to accommodate the desired fastener production rate. It may be appreciated by those skilled in the ar that a variety of machine parameters may be modified to attain acceptable and workable results when using the apparatus and method of the present invention. Accordingly, the machine and process parameter ranges disclosed herein are by way of example only and are not intended to limit the present invention.

Figure 2:
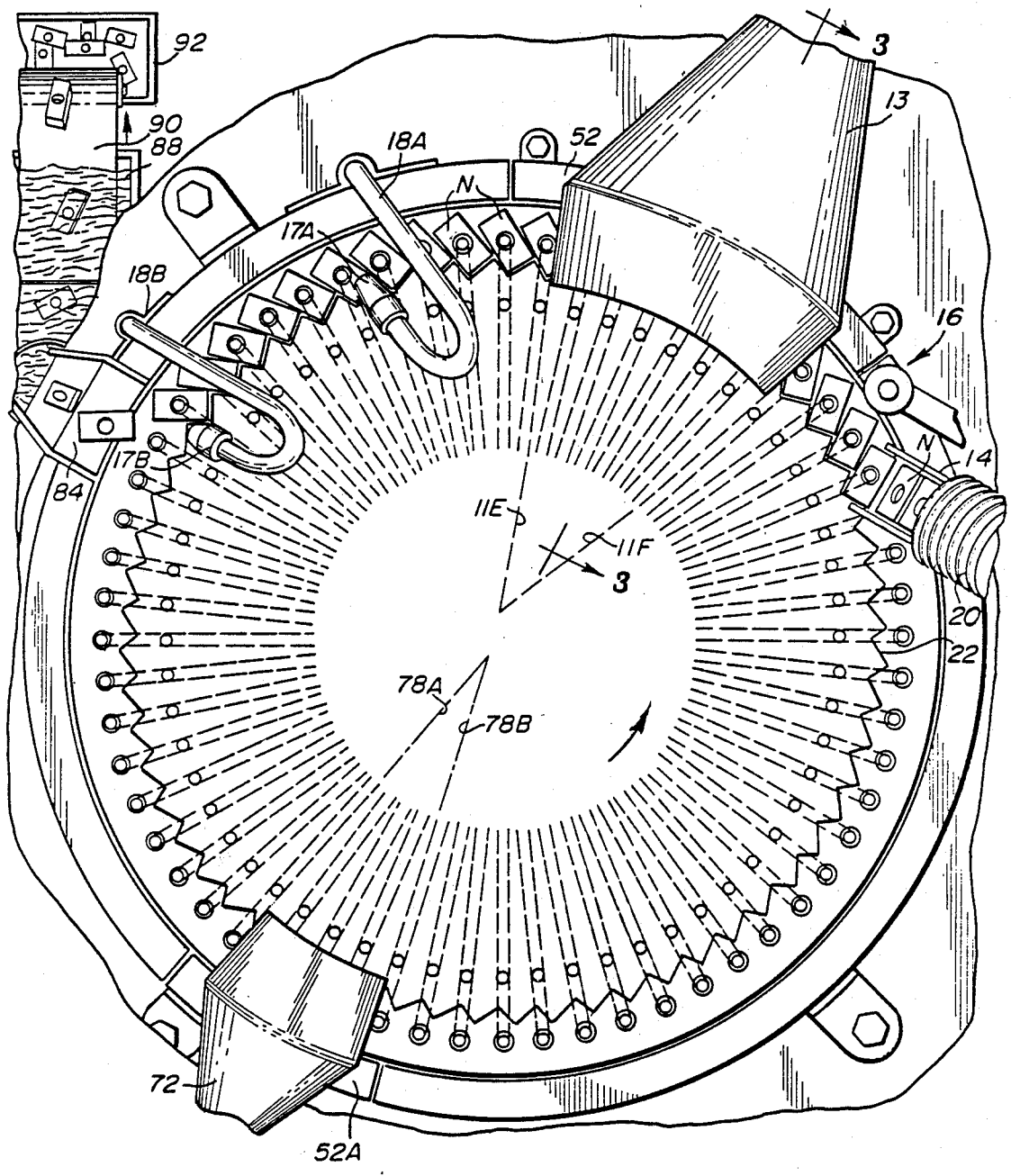
FIG. 2 is a top plan view of the structure of FIG. 1 showing details of the structure.

It should also be evident from FIGS. 1 and 2 that table 12 is provided with a plurality of pockets in the form of V notches 22 into which adjacent sides of the pierce nut N are received when the nuts are deposited from loading chute 14 onto table 12. V notches 22 are preferably formed so as to have a tapered leading edge relative to loading chute 14. This provides for improved efficiency in loading fastener such as pierce nuts N onto table 12.

As the operation of the illustrated embodiment of FIGS. 1 through 4 employs the principals taught in U.S. Pat. No. 3,335,074, U.S. Pat. No. 4,054,688 and U.S. Pat. No. 4,100,882, details of the present disclosure which are not necessary for an understanding of the invention are herein omitted, but may be ascertained and constructed from the structures disclosed and described in the aforementioned U.S. patents which are herein incorporated by reference.

Briefly stated, a hopper, such as a fluid bed hopper (not shown) provides a preferred resin type material including, but not limited to Teflon, Teflon compounds, resin powders, thermal setting resins, thermal plastics, Nylon powder, resin powder and similar sprayable powders. Preferably, powder material is contained in an air stream from the fluid bed hopper by a venturi type device. The air and powder stream is directed through a plurality of tubes 23 (one tube for each pocket formed on the top surface of table 12) by fluid pressure generated by an air pump (not shown). The air and powder stream is introduced into, housing 11 at aperture 15 and directed through the conduit path defined by housing 11, best illustrated in FIG. 3. Specifically, the air and powder stream is directed up conduit 11A to deflector 11B where it is deflected 90° into passageway 11C. Passageway 11C is preferably an arcuate, fan-shaped section emanating from the center point of table 12 and having its boundaries directed toward either side of hood 13. Specifically, this fan-shaped section is depicted by broken lines 11E and 11F illustrated in FIG. 2. Accordingly, when tube 34 is beneath hood 13, the passageway defined by conduit 11A, deflector 11B and passageway 11C is completed such that the air and powder stream is directed through conduit 23 and through tube 34 for deposit on pierce nut N. Such construction synchronizes the spraying of the air and powder stream with the vertical movement of tube 34. Table 12 is shown herein as being rotated by a pinion drive such as drive gear 24. However, it should be understood that rotation of the table may be accomplished by any of a variety of means well known in the art, including but not limited to a belt drive or direct drive from a motor source.

Figure 4:
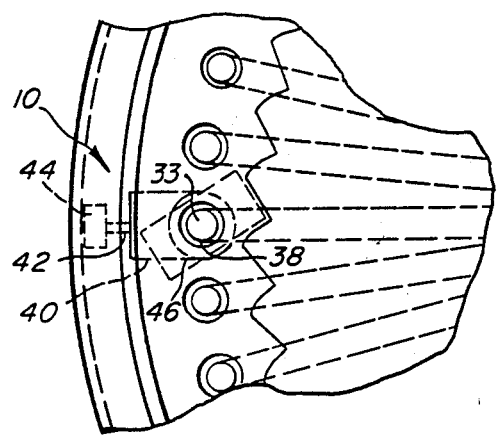
FIG. 4 is a fragmentary top plan view showing a portion of the structure of FIG. 2 in greater detail.

Referring to FIGS. 3 and 4, table 12 is shown to comprise a top plate 25, a support plate 25A and a lower plate 26, plates 25 and 25A being separated from plate 26 by spacer member 27. The plates 25, 25A and 26 and the spacer 27 are fixed by bolts 28 and pins 29. This table assembly is fixed to a frame member 30 by fasteners (not shown) to complete the table structure. Table 12 is mounted onto the housing 11 by a ball-bearing assembly 31 for rotation about the housing. The ball-bearing assembly preferably includes two bearing raceways but may include one, three or more depending on the use of the apparatus.

Referring still to FIG. 3, each of the tubes 23 is shown to extend radially outwardly from stationary member 11D, and each is directed towards a pocket on table 12 having a V notch 22 for receiving a pierce nut N. The V notch 22 is formed in top plate 25 and an opening 33 is formed in intermediate plate 25A such that it will be centrally located along the axis of the threaded portion of pierce nut N when the pierce nut is located with a pair of its faces contacting V notch 22. A plurality of conduit means is provided and includes a plurality of elongated tubes 34 associated with each of the pockets. In a first position, each tube 34 has its upper end disposed beneath the upper surface of plate 25A and is located substantially on the axis of a threaded opening in each pierce nut N disposed in notches 22 of table 12. Each tube 34 has an arcuate opening 36 formed in the upper end thereof, the arcuate opening being directed radially outwardly from the tube by virtue of an end cap 38 provided adjacent the extreme end of the elongated tube 34.

It should be appreciated by those skilled in the art that tube 34 may include a tube having a radial slot cut in its body or a movable end to vary the radial extent and height of the applied powdered material. The radial coverage of the applied powdered material may be from 30° to 360° of coverage and may extend in height from the width of one thread of an internally threaded fastener to coverage of all of the threads. A tube of the type described above may be found disclosed in copending U.S. patent applications, Ser. Nos. 907,582 and 913,339, assigned to the assignee of the present application.

It will be noted from FIGS. 3 and 4 that each tube 34 extends downwardly through a mounting block 40 having a shaft 42 extending radially outwardly therefrom, and a roller cam follower 44 mounted on the outer end of shaft 42. Block 40 is retained in a slotted opening 46 and is slidably movable in the up and down direction from the position shown in FIG. 3, in which arcuate opening 36 lies above the upper surface of plate 25A to a lowered position where arcuate opening 36 lies below the upper surface of plate 25A of table 12. In the instance where arcuate opening 36 lies above the upper surface of plate 25A, the opening is positioned within a pierce nut N positioned in the pocket. The lower end of the elongated tube 34 is connected to the tube 23 by a flex line 48 which allows relative movement between elongated tube 34 and tube 23.

A support member 50 is mounted adjacent that portion of travel along the path of rotation of table 12 wherein the powdered resin is to be sprayed onto the threaded portion of pierce nut N. A cam block 52 is mounted on upwardly extending arm 53 of support member 50 and is disposed for engagement with the roller cam follower 44 during rotation of table 12 along the prescribed path.

Cam block 52 is best shown in FIGS. 7 and 8, and a second embodiment in FIG. 9. Cam block 52 preferably comprises cam surfaces 54A and 54B for mating engagement with roller cam follower 44. A plurality of mounting holes 55 are formed in cam block 52 for mounting the cam block onto support member 50. Cam surface 54A, as illustrated by the profile of cam block 52, guides cam follower 44 and tube 34 up above plate 25A until the cam follower reaches an apex point 56. Further rotation of table 12 causes the upper cam surface 54B to guide cam follow 44 and tube 34 downward until tube 34 is below the upper surface of plate 25A. As previously described, the air and powder stream are directed toward the interior surface of pierce nut N during positioning of each respective tube 34 under hood 13, and while each cam follower 44 is within the cam path defined by cam block 52. This type of cam profile and powder and air spraying operation provides for complete coverage of the interior surfaces of pierce nut N.

In the alternate embodiment of FIG. 9, cam block 58 is illustrated such that the cam profile include a plateau (denoted by dashed lines 60A and 60B) at which time cam follower 44 and tube 34 remain at a constant height during rotation of table 12. The air and powder stream is directed toward the interior surface of pierce nut N when cam follower 44 is positioned between dashed lines 60A and 60B. Cam follower 44 is initially guided by cam surface 62A and subsequently by cam surface 62B. It should be noted that follower 44 will be in contact with cam surface 62A until the follower has traveled beyond plateau 60. This type of cam profile and air and powder spraying operation would provide for application of a patch type coating on the interior surface of pierce nut N wherein tube 34 would rise to a predetermined height and apply a coating to the internal surfaces of pierce nut N. Mounting holes 55 are also included on cam 58.

As will be evident, with rotation of table 12, a roller cam follower 44 associated with each elongated tube 34 disposed about the periphery of the table will enter cam block 52 or 58 and move along cam surface 54A and 54B or 62A and 62B. Such action provides movement of elongated tube 34 upwardly and downwardly during the spraying of resin material into the threaded portion of pierce nut N. Therefore, cam surface 54 may be of any desired angle which when coordinated with the table speed, and length of table rotation arc over which the spray is conducted, will form a desired thickness and quality of patch on the internal surface of pierce nut N. The height of cam surface 54 is also readily adjustable to control the length of patch formed on the threads as elongated tube 34 is move upwardly and downwardly along the centerline of the internal surface of pierce nut N.

As illustrated in FIG. 1, cam followers 44 are guided by guide rails 63, positioned about the periphery of the apparatus, prior to entering and after exiting cam block 52 or cam block 58. Guide rails 63 maintain the desired position of cam followers 44 and associated tubes 34 when air and powder or air alone is not being directed through the tubes.

While the end cap 38 of tube 34 is shown to provide a 360° arcuate opening 36, it should be understood that arcuate opening 36 may be blocked over a portion thereof to provide a spray of less than 360° over the internal surface of pierce nut N.

Figure 5:
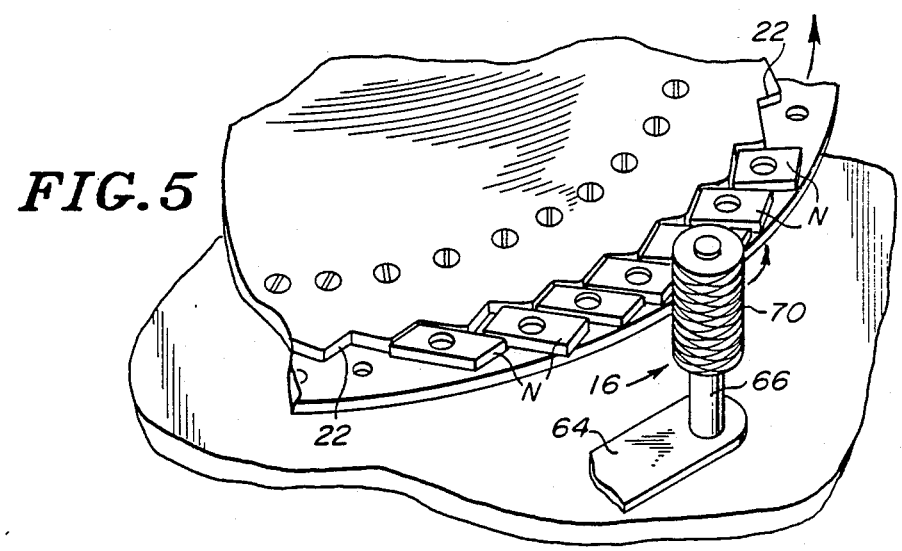
FIG. 5 is an enlarged perspective view showing portions of the structure of FIGS. 1 and 2 on an increased scale for clarity.
Figure 6:
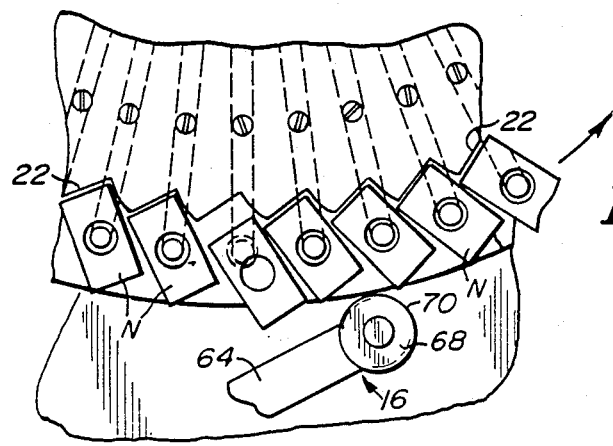
FIG. 6 is a top plan view of the apparatus of FIG. 5 showing the structure during operation of the device.

It is evident from the operation described above that each pierce nut N must be retained in the V notch 22 such that the centerline of the threaded portion of the pierce nut lies along the centerline of the elongated tube 34 in order to produce the desired result when the tube 34 is moved upwardly and downwardly within the pierce nut. In order to insure that each pierce nut N is properly located with adjacent sides of the nut contacting a V notch 22, the rotatable member 16 is disposed adjacent the outer edge of the table 12 as shown in FIGS. 5 and 6.

A fixed mounting bar 64 is located below and adjacent the periphery of table 12 and has a shaft 66 extending upwardly therefrom. A rotatable wheel 68 is mounted on shaft 66 and may include a knurled finish 70 on its outer surface. As best shown in FIG. 6, should a pierce nut N be deposited on table 12 such that it is not located correctly within a pocket, wheel 68 is positioned such that a surface of pierce nut N will come in contact with outer surface 70 of wheel 68 and be moved into a position where adjacent surfaces of the nut are in contact with V notch 22. It should be noted the pierce nut N will tend to slide toward the center of table 12 into V notch 22 when out of position and contacted by wheel 68. Since wheel 68 is free to rotate when contacting a surface of the pierce nut N, there is a smooth transition of the nut past wheel 68 permitting the orderly and trouble-free relocation of a pierce nut N even when table 12 is being rotated at a relatively high speed.

Referring to FIGS. 1 and 2, the sequence of operation of the apparatus herein disclosed is shown to terminate at a position wherein nozzle 17B is disposed adjacent the top surface of table 12 as previously described. Nozzles 17A and 17B may be supported in a fixed manner by brackets or other arrangements which have not been herein described as they are well known in the art. The source of air pressure which is provided to nozzles 17A and 17B may be the same source as that provided for spraying of the resin material onto each pierce nut N, or a separate source of air pressure may be provided, the only requirement being that the velocity of air be sufficient to move a pierce nut along the surface of plate 25A and off of table 12.

Variations may be made to the operation of nozzles 17A and 17B as they may be operated continuously or may be intermittently activated if such operation is desired. As illustrate 17A is positioned to remove cold or improperly coated pierce nuts N as table 12 is rotated. Depending on the positioning of nozzle 17A, it may be desirable to provide an air stream of reduced velocity through nozzle 17A to avoid undesired displacement of pierce nut N. With nozzle 17B mounted as shown, the air emanating from the nozzle is directed such that it moves a pierce nut N from table 12.

In prior art devices of the type described, wherein the tube for applying resin to the threaded portion of an article lies substantially close to the bottom surface of the nut or threaded article being coated, suction has been produced in the tube to remove excess material from the tube and from the tube end in order to clean the tube for a subsequent operation. In the present device, elongated tube 34 is guided above plate 25A by a cam member 52A similar in profile to those of cam members 52 and 58 of FIGS. 7 and 9, respectively, while under hood 72.

At that point, as best shown in reference to FIGS. 1, 2 and 3, air from an air source (not shown) is directed to aperture 74 and through conduit 76 out through tube 34. As table 12 rotates such that tubes 34 are positioned below hood 72, a passageway defined by conduit 76 is created between aperture 74 and tube 34, similar to the passageway created by alignment of conduit 11A, deflector 11B and passageway 11C previously described. After tube 34 passes from below hood 72, the passageway no longer exists between aperture 74 and tube 34, since table 12 is rotated past the arcuate area defined by broken lines 78A and 78B in FIG. 2. The arcuate area between lines 78A and 78B defines the area in which a passageway is constructed between aperture 74 and tube 34. This area emanates from a point positioned to one side of the center point of table 12. Accordingly, as illustrated, the passageway between aperture 74 and tube 34 is only available when tube 34 is beneath hood 72, and at all other times, no passageway exists there between.

In reference to FIGS. 1 and 3, it will be noted that a vacuum source may be in communication with aperture 80 in table 12 through hose 82. This vacuum is provided to ensure that powder which may build up between plates 25, 25A and 26 is efficiently removed therefrom to avoid degradation in the performance of the device of the present invention.

As noted previously, after the processing operation is completed, each pierce nut N is directed off of table 12 by an air stream emanating from nozzle 17B. Each pierce nut is then directed down exit chute 84 through tube 86 into coolant tank 88. Each processed pierce nut falls through coolant in tank 88, onto a conveyor 90 and is ultimately deposited into a portable bin 92 for collection and shipping.

Thus, a unique, cost effective method and apparatus for coating a variety of fasteners is provided. Further, the method and apparatus of the present invention provides improved adjustability and selectability of the size, shape and thickness of the coating applied to the fasteners.

We claim:

1. Apparatus for applying a coating material onto an article having and opening on at least one end thereof comprising:
    a support for receiving said article and conveying it along a path with the article in a substantially fixed relation relative to said support and having the longitudinal axis of the article in an up and down position and with the opening disposed at the lower end thereof and substantially uncovered;
    conduit means comprising an elongated tube having its upper end disposed in a first position beneath said support and substantially on the longitudinal axis of said article, said tube having an opening formed in the upper end thereof facing radially outwardly from said tube over an arcuate portion of each said tube, said tube being mounted for relative movement from said first position wherein the upper end thereof lies beneath said support to a second position wherein said upper end of said tube lies within said article opening for application of said coating material;
    means for moving said tube from said first position to said second position in response to movement of said support along said path; and
    means for adjusting the length of movement of said tube from said first position to said second position.

2. Apparatus as set forth in claim 1 wherein said means for moving said tube from said first position to said second position in response to movement of said support along said path includes means for moving said tube such that said tube traverses substantially the complete thickness of said article.

3. Apparatus as set forth in claim 1 wherein said means for moving said tube comprises a cam surface disposed adjacent to and substantially fixed relative to the path of said article, and said elongated tube includes a cam follower for mating engagement with said cam surface.

4. Apparatus as set forth in claim 1 wherein said arcuate portion of said tube opening is 360°.

5. Apparatus for applying a coating material onto a succession of articles, each having an opening on at least one end thereof comprising;
    a feeder to supply articles in substantially continuous succession;
    a support for receiving said articles from said feeder, and for conveying them along a path for treatment, the successive articles each having a longitudinal axis in an up and down position with the opening disposed at the lower end thereof and substantially uncovered;
    means for applying said coating material onto said articles;
    a plurality of pockets disposed on said support, each of said pockets formed for receiving an article; and
    means for positioning an article associated with said support to contact at least one of said articles which has been deposited outside at least one of said pockets and effective to move said one article into at least one of said pockets while substantially eliminating drag caused by contact of said means for positioning with said one article and subsequent movement of said article into at least one of said pockets.

6. Apparatus set forth in claim 5 wherein said means for positioning an article comprises a rotatable member disposed adjacent said support at a point on said path to correct the position of an article which has been deposited outside at least one of said pockets.

7. Apparatus as set forth in claim 6 wherein said support comprises a circular plate mounted for rotation along said path about a hub and said pockets comprise a plurality of outwardly facing notches on the upper surface of said plate, said rotatable member comprising a wheel mounted on an axis substantially parallel to the axis of rotation of said circular plate and said wheel has an outer surface disposed adjacent the periphery of said plate for contacting an article into its respective pocket.

8. Apparatus as set forth in claim 7 wherein the outer surface of said wheel is provided with a knurled finish and is pivotable with respect to said circular plate.

9. Apparatus as set forth in claim 7 which further includes fluid pressure means directed towards the outer periphery of said plate along its path of rotation and disposed such that each notch passes adjacent thereto whereby an article is removed from said pocket by fluid force when said fluid pressure means is activated.

10. Apparatus as set forth in claim 9 wherein said fluid pressure means comprises an air jet.

11. Apparatus for applying a patch of coating material onto the threaded portions of a succession of internally threaded articles, each having an opening on at least one end thereof comprising:
 a feeder for supplying threaded articles in substantially continuous succession;
 a support for receiving said threaded articles form said feeder for conveying the articles along a path for application of said resin, the successive threaded articles having the axes of their threaded portions in an up and down position with the openings disposed at the lower end thereof and substantially uncovered;
 conduit means comprising a plurality of elongated tubes, each tube having its upper end disposed in a first position beneath said support and substantially on the axis of the threaded portion of a respective article, each said tube having an opening formed in the upper end thereof facing radially outwardly from said tube over an arcuate portion of said tube, each said tube being mounted for relative movement from said first position wherein the upper end thereof lies beneath said support to a second position wherein said upper end of said tube lies within said respective article opening for application of said coating material;
 means relative to the path of each said article for moving each said tube from said first position to said second position in response to movement of said support along said path; and
 means for adjusting the distance of movement of said tube from said first position to said second position.

12. Apparatus as set forth in claim 11 wherein said means for moving said tube from said first position to said second position in response to movement of said support along said path includes means for moving each said tube such that said tube traverses substantially the complete thickness of said article.

13. Apparatus as set forth in claim 11 wherein said means for moving said tube comprises a cam surface and each of said elongated tubes includes a cam follower connected thereto for mating engagement with said cam surface.

14. Apparatus as set forth in claim 11 wherein said arcuate portion of each of said tube openings is 360°.

15. Apparatus as set forth in claim 11 which further includes a plurality of pockets disposed on said support, each of said pockets having a tapered edge for receiving one of said articles; and
 a rotatable member disposed adjacent said support at a point on said path for contacting an article which has been deposited outside said pocket and effective to move said article into said pocket.

16. Apparatus as set forth in claim 15 wherein said support comprises a circular plate mounted for rotation along said path about a hub and said pockets comprise a plurality of outwardly facing notches on the upper surface of said plate, said rotatable member comprising a wheel mounted on an axis of rotation of said circular plate, and said wheel has an outer surface disposed adjacent the periphery of said plate for contacting an article lying outside the periphery of said plate and moving the article into its respective pocket.

17. Apparatus as set forth in claim 16 wherein said wheel outer surface is provided with a knurled finish.

18. Apparatus as set forth in claim 11 which further includes fluid pressure means directed towards the outer periphery of said plate along its path of rotation and disposed such that each notch passes adjacent thereto whereby an article is removed from said pocket by fluid force when said fluid pressure means is activated.

19. Apparatus as set forth in claim 18 wherein said fluid pressure means comprises an air jet.

20. A process for applying resin onto a succession of articles, each having an opening on at least one end thereof comprising the steps of:
 conveying the articles on a support along a path for application of the resin with the longitudinal axes of the articles disposed in an up and down position with the openings disposed at the lower end thereof and substantially uncovered;
 directing particles of resin under pressure from the end of a tube disposed substantially on the centerline of the longitudinal axes of the articles to cover an area of said article with resin material;
 moving said tube up and down along the longitudinal axes of said articles in response to movement of said support to extend the area of material a desired distance.

21. A process for applying resin as set forth in claim 20 wherein said resin material is applied over an arcuate area of 360°.

22. A process for applying resin as set forth in claim 20 wherein each of said articles includes an interior surface and said resin material is applied onto substantially the entire interior surface of each of said articles.

23. A process for applying resin as set forth in claim 20 which further includes the step of discharging a flow of fluid from the end of said tube while the tube is positioned above the support to effect cleaning of resin particles from the tube.

* * * * *